(12) United States Patent
Kieren

(10) Patent No.: US 7,961,864 B2
(45) Date of Patent: *Jun. 14, 2011

(54) LOCAL NUMBER PORTABILITY CROSS CONNECT METHOD

(75) Inventor: Joseph Raymond Kieren, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1090 days.

This patent is subject to a terminal disclaimer.

(21) Appl. No.: 11/704,456

(22) Filed: Feb. 9, 2007

(65) Prior Publication Data

US 2007/0133778 A1 Jun. 14, 2007

Related U.S. Application Data

(63) Continuation of application No. 10/777,392, filed on Feb. 13, 2004, now Pat. No. 7,194,082, which is a continuation of application No. 09/656,670, filed on Sep. 7, 2000, now Pat. No. 6,711,251.

(51) Int. Cl.
*H04M 7/00* (2006.01)

(52) U.S. Cl. ............ 379/221.13; 379/219; 379/201.05; 379/112.06; 379/323; 379/326; 379/327

(58) Field of Classification Search ............ 379/221.13, 379/219, 201.05, 112.06, 323, 326, 327
See application file for complete search history.

(56) References Cited

U.S. PATENT DOCUMENTS

| | | | | |
|---|---|---|---|---|
| 6,035,029 | A * | 3/2000 | Little et al. | 379/219 |
| 6,301,351 | B1 * | 10/2001 | King | 379/221.01 |
| 6,600,727 | B1 * | 7/2003 | Mackay | 370/293 |

* cited by examiner

*Primary Examiner* — Quynh H Nguyen
(74) *Attorney, Agent, or Firm* — Toler Law Group

(57) ABSTRACT

A method is provided to implement a subscriber local number portability migration request. The method includes sending a trigger signal to a cross-connect device to cause the cross-connect device to switch between a first communication channel and a second communication channel. The first communication channel is between an originating switch associated with a subscriber's directory number and a distribution frame. The second communication channel is between a porting switch and the distribution frame. The method also includes validating that the cross-connect device switched between the first communication channel and the second communication channel.

20 Claims, 3 Drawing Sheets

LOCAL NUMBER PORTABILITY CROSS CONNECT METHOD

RELATED APPLICATION

The present application is a continuation application of U.S. patent application Ser. No. 10/777,392 entitled "Local Number Portability Cross Connect Switch Network", which is a continuation of U.S. patent application Ser. No. 09/656,670 filed Sep. 7, 2000, now U.S. Pat. No. 6,711,251, both of which are incorporated by reference herein in their entirety.

FIELD OF THE DISCLOSURE

The present disclosure relates generally to telecommunication methods, and more particularly, relates to a cross connect methods for enabling local number portability in an intelligent switched telecommunications network.

BACKGROUND

Local Number Portability (LNP) allows telephone service subscribers to retain their same directory number, at the same location, when a subscriber changes from one local telephone service provider to another. Telephone number portability was mandated by the Telecommunications Act of 1996.

Telephone calls are routed from a calling subscriber to a called subscriber through the public switched telephone network. A central office switch is used for connecting the subscriber telephone lines. Subscribers connected to a common switch, or End Office (EO) are assigned a unique directory number, commonly referred to as a telephone number. The format of the directory number is NXX-XXXX, where "N" refers to any digit except zero or one and "X" refers to any one of 10 digits. Directory numbers are assigned in blocks of ten thousand to each Local Exchange Carrier (LEC). The first three digits of the directory number are referred to as the exchange code. Each exchange code corresponds to a particular switch or EO. The last four digits of a directory number are referred to as the subscriber's line code. The United States is also divided into "area codes," more technically referred as Numbering Plan Area (NPA) codes. Thus, each telephone subscriber is associated with a unique 10 digit directory number comprising the three digit NPA code, the three digit exchange code (NXX) plus a four digit line number (XXXX).

The area code and exchange code prefix is used to route the call to the serving End Office. At the End Office, the local switch routes the call to the subscriber's line, which is designated by the last four digits of the directory number. Thus, when a calling party places a telephone call, the first six digits of the dial directory number uniquely identify the terminating switch for the telephone call. The originating switch relies on this relationship to determine the most efficient routing path from the originating switch to the terminating switch at the End Office. Specifically, each switch typically includes a database that cross-references the area code, exchange code prefixes (NPA-NXX) to the various switches. The originating switch then routes the telephone call to the correct terminating switch, which, in turn, further routes the telephone call to the correct subscriber telephone line.

With the passage of the Telecommunications Act of 1996, more than one local telephone service provider in the same geographic area may install and maintain the switching equipment required to provide local telephone service. Indeed, their respective switches can be located in the same building. Local telephone service subscribers can then change their telephone service providers by having the lines servicing their premises disconnected from their previous local telephone service provider and reconnected to their new local telephone service provider. This disconnection and reconnection is referred to as a "cutover," and may take place at any point in the telephone line circuit to a subscriber's premises. For example, a subscriber line may be cutover at the terminal jack located at the subscriber's premises, at the local telephone service provider's distribution frame, or at any other point in the circuit. Local number portability requires that a subscriber and directory number be re-assigned from the switch associated with the present local telephone service provider to the switch associated with the new local telephone service provider. In a local number portability environment, therefore, the area code-exchange code portion of a directory number will not uniquely identify the switch servicing the line assigned to that directory number. Accordingly, additional telephone call routing procedures are required to allow an originating switch that initially receives a telephone call to determine the correct terminating switch. This is typically accomplished by a LNP database that cross-references individual portable directory numbers to the various switches.

Accordingly, in a LNP environment, originating stations throughout the public switched telephone network refer to their respective LNP databases to determine the terminating stations that service ported subscriber telephone lines. Whenever a subscriber changes local telephone service providers but wishes to maintain the same directory number, all of the LNP databases must be programmed with the porting subscriber directory number and an identification code for the new terminating switch. Until the porting subscriber line is physically cutover from the original terminating switch to the new terminating switch, telephone calls directed to the subscriber directory number must be routed to the prior telephone service provider's terminating switch. After the subscriber line has been cutover, however, telephone calls directed to the subscriber's directory number must be routed to the new telephone service provider's terminating switch. Timing problems, therefore, arise because the physical cutover of the subscriber line occurs at a particular time instant. The various LNP databases, on the other hand, cannot be reprogrammed at the same instant. Thus, subscribers may experience interruptions in phone service until the LNP databases can be updated to reflect the relationship between the subscriber's directory number and the new telephone service provider's terminating switch. In addition, coordinating the physical cutover and database updating imposes scheduling demands upon service provider personnel. Thus, there exists a need for an improved system and method for enabling local number portability.

BRIEF DESCRIPTION OF THE DRAWINGS

For a more complete understanding of this invention reference should now be had to the embodiments illustrated in greater detail in the accompanying figures and described below by way of examples of the invention wherein.

DETAILED DESCRIPTION

Figure 1:
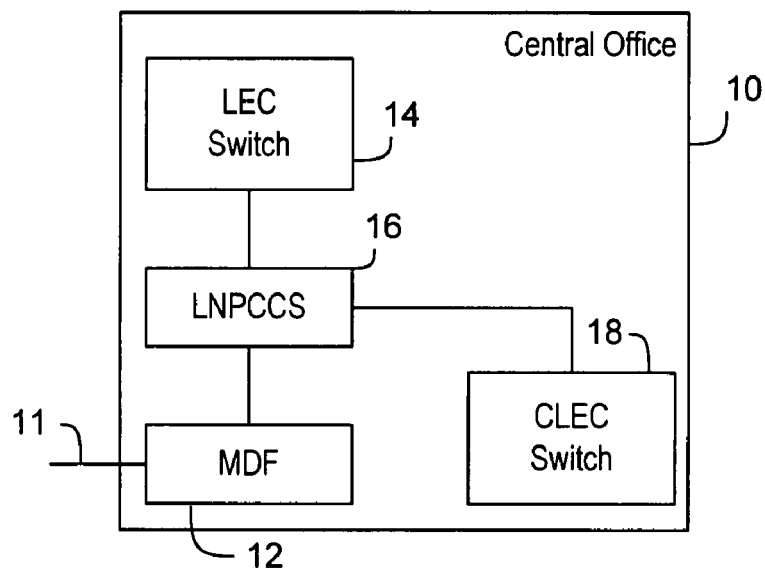
FIG. 1 is a schematic block diagram of the present invention in a central office environment.

Referring now to FIG. 1, there is shown a schematic block diagram of one embodiment of the present invention in a central office (CO) environment. The central office 10 is the site where the Local Exchange Carrier's (LEC) equipment resides which routes calls to and from customers served by the LEC. Telephone calls routed to the central office 10 enter the building on communication line 11 and are directed to the Main Distribution Frame (MDF) 12. The three-digit exchange code associated with the incoming dial directory number is routed to the corresponding LEC switch 14, and specifically, to that portion of the switch corresponding to the subscriber's line code. As described above, in order to implement LNP, the physical routing of a subscriber line must be cutover from the originating switch such as LEC switch 14 to the ported switch such as the Competitive Local Exchange Carrier (CLEC) switch 18. The Local Number Portability Cross Connect Switch (LNPCCS) 16 accomplishes the cutover by switching the connection to the MDF from the originating switch to the ported switch upon receiving a predetermined signaling sequence as described in more detail below.

Figure 2:
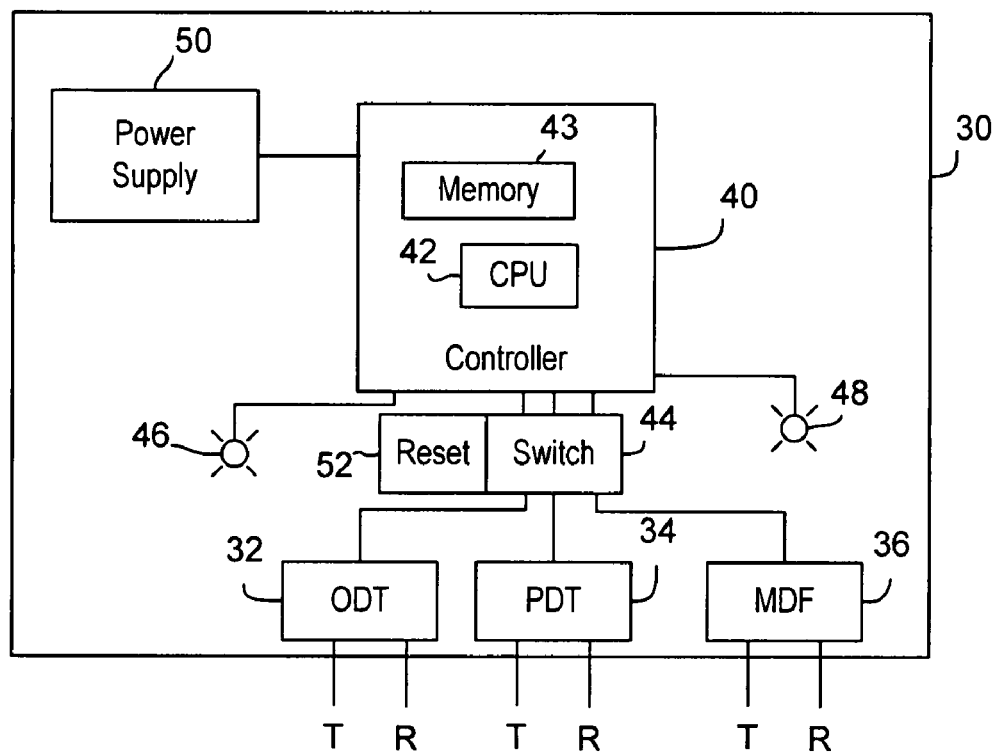
FIG. 2 is a schematic block diagram of one embodiment of the LNPCCS according to the present invention.

Referring now to FIG. 2, there is shown a schematic block diagram of one embodiment of the LNPCCS 30 according to the present invention. The LNPCCS 30 comprises an Originating Dial Tone (ODT) port 32 for receiving the line connection from the originating switch associated with a subscriber's directory number, a Ported Dial Tone (PDT) port 34 for receiving the line connection from the porting switch associated with the subscriber's directory number, and a Main Distribution Frame (MDF) port 36 for connecting the LNPCCS 30 to the Main Distribution Frame associated with the originating switch and the ported switch. Each of the ports 32, 34, and 36 include terminal blocks for the tip and ring portions of the twisted wire pair. The LNPCCS 30 may be installed in the Central Office wiring room on the MDF. The wiring associated with each of the ports 32, 34, 36 may support 48 volts DC (normal telephone line power) and 96 volts AC (telephone ringing generator).

The LNPCCS 30 also includes a switch 44 connecting the ODT port 32 and PDT port 34 to the MDF port 36, and a controller 40 in operative communication with the switch 44, ODT port 32, PDT port 34 and MDF port 36. The switch is connected to the ports such that the ODT path is normally closed and the PDT path is normally open. In other words, the default switch connection is a closed loop from the ODT port 32 to the MDF port 36 and an open loop between the PDT port 34 and the MDF port 36. The switch 44 may be a double-pole, double-throw relay-type switch such as is available from NEC Corp. as model ED2-5T. Light emitting diodes (LEDs) 46, 48 indicate the state of the switch. The controller 40 includes a processor 42 and associated memory 43. An example of a suitable controller is model PIC16C505 available from Microchip Corp. The controller 40 and "Arm" LED 46 are line powered from the ODT side before the trigger signal is received by the controller. After receipt of the trigger signal, the "Trip" LED 48 and controller 40 are line powered from the PDT side of the device.

The "Arm" LED 46 is active when the ODT port 32 and MDF port 36 are wired and the switch 44 is ready to receive the trigger signal. The trigger signal may be a Mechanized Loop Testing (MLT) tracking tone, which can be received from either the ODT port 32 or the PDT port 34. When the trigger signal is received, the "Trip" LED 48 is activated to alert an operator of the state of the switch.

A power supply 50 is also included to provide alternative power to the switch 44 and controller 40. Power may be supplied to the ODT side of the device until the switch is activated and the unit is later removed from the MDF. A manual override in the form a reset switch 52 is also provided to "build back" or re-establish the original connection from the ODT port 32 to the MDF port 36 after the switch 44 has been activated. In such cases, the power supply 50 drives the switch 44 to close the ODT path and open the PDT path to the MDF.

Figure 3:
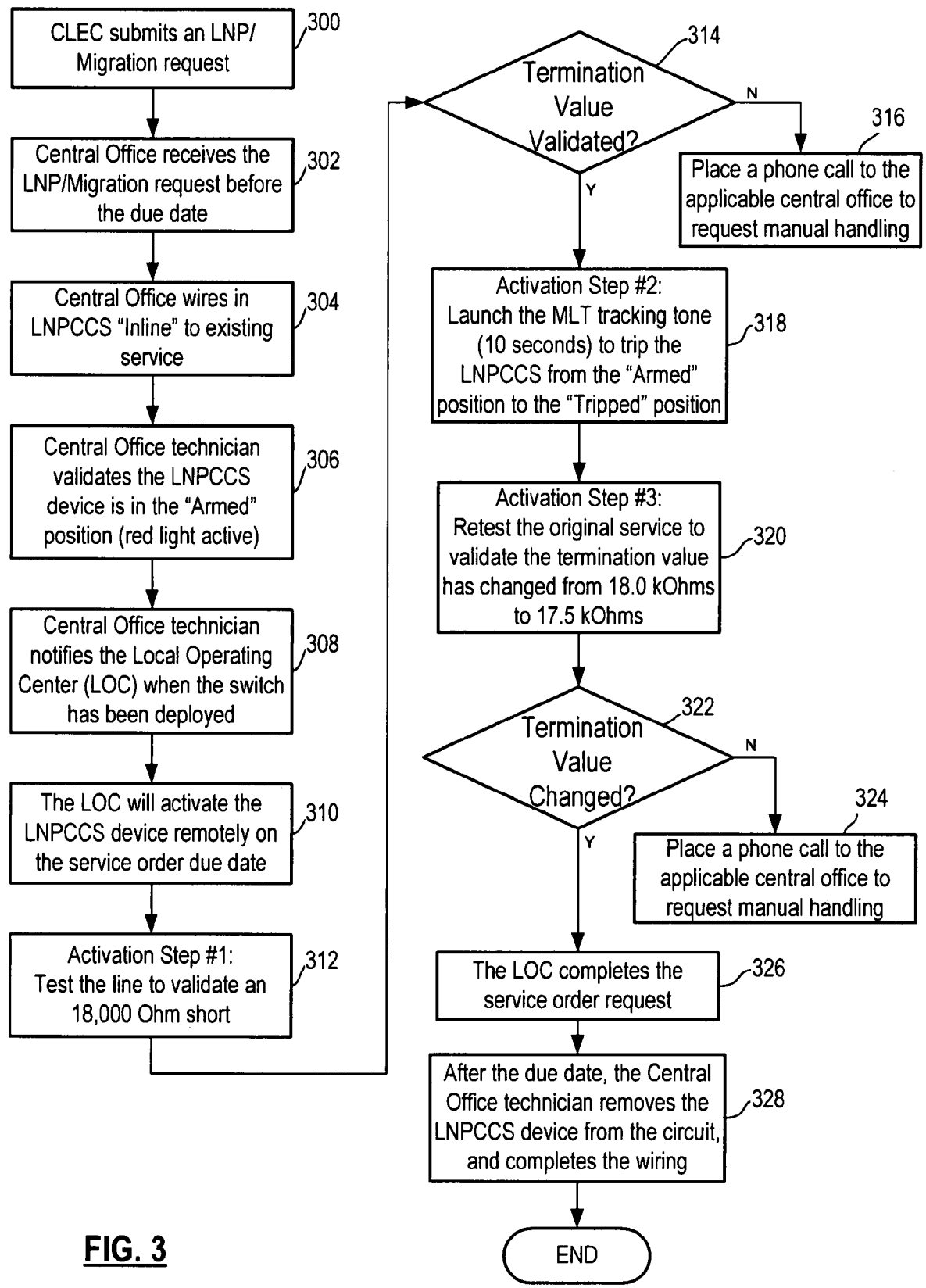
FIG. 3 is a logic flow diagram of one method of implementing the LNPCCS of the present invention.

Referring now to FIG. 3, there is shown a logic flow diagram of one method of implementing the LNPCCS of the present invention. The method of implementing local number portability with the LNPCCS begins in step 300 when a CLEC submits an LNP migration request to the telephone service subscriber's present local exchange carrier. The migration request represents the subscriber's desire to change service providers. In step 302, the LEC creates an internal service order to process the CLEC's LNP migration request. At this time, a due date for the LNP migration is decided upon between the CLEC and the customer, and the CLEC and LEC.

In step 304, the central office technician wires the LNPCCS "in line" to the existing telephone service. This is accomplished by wiring in the jumper from the original office equipment to the originating dial tone (ODT) port on the LNPCCS device, and the jumper from the main distribution frame (MDF) port to the vertical frame or MDF, thereby completing the original circuit path. These connections are made by inserting the "tip" and "ring" wire pair into the respective ODT and MDF tip and ring ports on the LNPCCS device. This process is also repeated for the tip and ring wire pair for the ported dial tone (PDT) port to the CLEC's switching equipment. In step 306, the central office technician validates that the LNPCCS device is in the "armed" position, which is indicated by the red light emitting diode (LED). When the armed LED is active, it indicates to the technician that the LNPCCS has been properly connected in line with the customer's original circuit path. The central office technician can then notify the local operating center that the switch has been deployed such as in step 308.

Once the LNPCCS is armed and ready, the local operating center activates the device remotely on the service order due date, in step 310. The activation process begins in step 312 by testing for the presence of a predetermined resistance on the ODT side when the switch is in the ODT state. The line may be tested for an 18 kOhm short from ODT side. At this time, the processor and the ODT LED are line powered from the ODT side of the circuit before the activation tone is received. In step 314, a check is made as to whether the termination value has been validated. Specifically, the tip to ring resistance of the ODT port when the switch is in the. ODT to MDF state is tested to detect a predetermined resistance value, which, in this example, is 18 kOhm. If not, in step 316, the central office is contacted and the request made to check the integrity of the connection or manually cutover the service migration request.

If the line has been validated, in step 318, the device is switched by signaling a predetermined tone from either the ODT or PDT side of the device to trip the LNPCCS from the armed position to the "tripped" position. The signaling tone may be a Mechanized Loop Testing (MLT) tracking tone of approximately 10-second duration transmitted on the ODT side of the device. The MLT tone may be a 577.5 Hz signal of 3.25V amplitude that is pulsed on for 100 ms and off for 100 ms for a pulse train duration of at least two seconds. The signal is delivered between the tip and ring connections. This signaling tone is desirable because it is a standardized signal available to all telephone service providers, yet is unique enough that a device is unlikely to be accidentally or prematurely tripped by normal data or voice traffic over the original subscriber loop. After reception of the signaling tone, the green tripped LED is powered from the PDT side of the device. In addition, subsequent triggering tones can be used to toggle the state of the switch.

To ensure the device has been properly activated, in step 320, the original service is re-tested to validate that the termination value has changed by a predetermined amount. The tip to ring termination value has changed from 18 kOhms to 17.5 kOhms on the ODT port when the switch is in the PDT to MDF state. If the termination value has not changed, as indicated in step 322, the central office is again contacted in step 324 to troubleshoot these device connections. Otherwise, in step 326, the local operating center completes the service order request by modifying the CLEC database records to indicate the CLEC's terminating switch for the associated customer's directory number.

As shown in step 328, the LNPCCS device is removed from the circuits after a predetermined period of time and the circuit change is hard-wired without disrupting service, such that the LNPCCS unit is now available for reuse with other service order requests.

Figure 4:
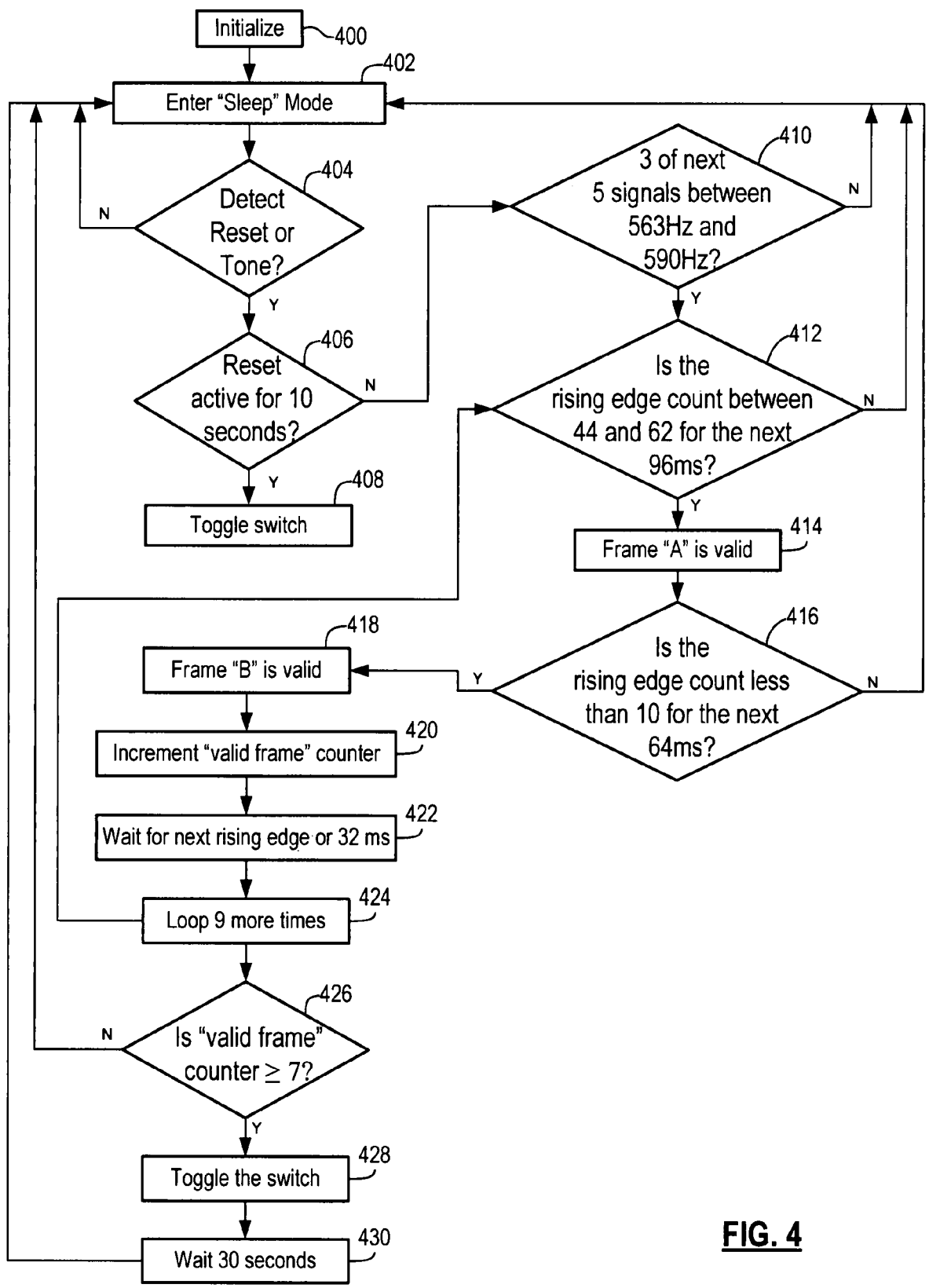
FIG. 4 is a logic flow diagram of another method of activating the LNPCCS of the present invention.

Referring now to FIG. 4, there is shown a logic flow diagram of another method of activating the LNPCCS of the present invention. The logic diagram of FIG. 4 describes one example of a specific MLT tracking tone implementation. At the start of the logic, it is assumed that the LNPCCS is correctly connected between the MDF and ODT and PDT switches. At this point, the LNPCCS is line powered from the ODT side of the device by the 48 VDC line voltage. This power is regulated by the power supply to 5.0 VDC at 3.75 mA. The logic begins in step 400 by initializing all program variables. This includes testing the switch connection to insure that the LNPCCS is in the ODT to MDF state, and activating the "Armed" LED. In step 402, the controller enters a "sleep" mode and waits for the activation signal.

In step 404, unless the Reset button on the device is activated, or a tone received, the controller remains in the sleep mode. Otherwise, in step 406, if the Reset button is activated for a predetermined period of time, the switch is activated to toggle the port (either ODT or PDT) connected to the MDF as shown in step 408.

If a tone is detected in step 404, steps 410 through 426 determine if the tone is the desired signaling tone. In this example, the desired signaling tone is an MLT tone consisting of a 577.5 Hz audio tone with a 5 Hz cadence. Accordingly, in steps 410 and 414, the "on" portion of the desired pulse train is detected and validated. Similarly, in steps 416 through 422, the "off" portion of the desired pulse train is detected and validated. The validity of the overall signal is assured in steps 424 and 426 by repeated detection of the predetermined signal for a threshold number of cycles. If the signal has been validated, the logic continues to step 428 where the switch is toggled to change the port (ODT or PDT) connected to the MDF. The devices then pauses for a predetermined period of time, during which time, the device power can be changed from the ODT side to the PDT side, for example.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended. claims.

What is claimed is:

1. A method comprising:
   sending a trigger signal to a cross-connect switch at a central office to cause the cross-connect switch to switch between a first communication channel and a second communication channel, wherein the first communication channel is established by the cross-connect switch between a main distribution frame port and an originating dial tone port by an internal switch to couple a local exchange carrier switch associated with a directory number of a subscriber and a distribution frame, and the second communication channel is established by the cross-connect switch between the main distribution frame port and a ported dial tone port by the internal switch to couple a competitive local exchange carrier switch and the distribution frame, wherein the local exchange carrier switch and the competitive local exchange carrier switch are at the central office; and
   validating that the cross-connect switch switched between the first communication channel and the second communication channel.

2. The method of claim 1, wherein validating that the cross-connect switch switched between the first communication channel and the second communication channel comprises determining whether the first communication channel has been deactivated.

3. The method of claim 1, wherein validating that the cross-connect switch switched between the first communication channel and the second communication channel comprises determining whether a predetermined resistance is detected on the first communication channel.

4. The method of claim 1, further comprising validating that the first communication channel is active at the cross-connect switch before sending the trigger signal.

5. The method of claim 4, wherein validating that the first communication channel is active at the cross-connect switch before sending the trigger signal comprises determining whether a predetermined resistance is detected on the first communication channel.

6. The method of claim 5, wherein validating that the cross-connect switch switched between the first communication channel and the second communication channel comprises determining whether a resistance value detected on the first communication channel has changed by a predetermined amount after sending the trigger signal.

7. The method of claim 1, wherein the trigger signal comprises a mechanized loop testing tracking tone sent via the second communication channel.

8. The method of claim 1, wherein the trigger signal comprises a mechanized loop testing tracking tone sent via the first communication channel.

9. The method of claim 1, further comprising updating a database to associate the directory number of the subscriber with the competitive local exchange carrier switch after sending the trigger signal.

10. The method of claim 1, further comprising sending a second trigger signal to the cross-connect switch to cause the cross-connect switch to switch between the second communication channel and the first communication channel.

11. A method comprising:
    receiving a trigger signal at a cross-connect switch, wherein the cross-connect switch connects a distribution frame to one of a local exchange carrier switch associated with a directory number of a subscriber and a competitive local exchange carrier switch, wherein the cross-connect switch, the distribution frame, the local exchange carrier switch, and the competitive local exchange carrier switch are at a central office associated with a local exchange carrier; and
    switching between a first communication channel and a second communication channel after receiving the trigger signal, wherein the first communication channel is established by the cross-connect switch between a main distribution frame port and an originating dial tone port by an internal switch to couple the local exchange carrier switch and the distribution frame, and the second communication channel is established by the cross-connect switch between the main distribution frame port and a ported dial tone port by the internal switch to couple the competitive local exchange carrier switch and the distribution frame.

12. The method of claim 11, further comprising activating an indicator at the cross-connect switch to show which of the first and second communication channels is active.

13. The method of claim 11, wherein the trigger signal is received via the local exchange carrier switch.

14. The method of claim 11, wherein the trigger signal is received via the competitive local exchange carrier switch.

15. The method of claim 11, wherein switching between the first communication channel and the second communication channel comprises deactivating the first communication channel and activating the second communication channel.

16. The method of claim 11, wherein the trigger signal comprises a mechanized loop testing tracking tone.

17. The method of claim 11, further comprising receiving a reset signal and switching between the second communication channel and the first communication channel in response to the reset signal.

18. A cross-connect switch comprising:
main distribution port to connect to a distribution frame at a central office of a local exchange carrier;
an originating dial tone port to connect to a local exchange carrier switch at the central office of the local exchange carrier;
a ported dial tone port to connect to a competitive local exchange carrier switch at the central office of the local exchange carrier;
an internal switch; and
a controller to receive a trigger signal via at least one of the originating dial tone port and the ported dial tone port, wherein the controller causes the internal switch to deactivate a first communication channel between the originating dial tone port and the main distribution port and to activate a second communication channel between the ported dial tone port and the main distribution port after the trigger signal is received.

19. The cross-connect switch of claim 18, wherein the controller is powered via the first communication channel when the first communication channel is active and is powered via the second communication channel when the second communication channel is active.

20. The cross-connect switch of claim 18, wherein the controller is powered by an onboard power supply.

* * * * *